(12) United States Patent
Hata et al.

(10) Patent No.: US 9,865,371 B2
(45) Date of Patent: Jan. 9, 2018

(54) CARBON NANOTUBE COMPOSITE MATERIAL AND CONDUCTIVE MATERIAL

(71) Applicant: NATIONAL INSTITUTE OF ADVANCED INDUSTRIAL SCIENCE AND TECHNOLOGY, Chiyoda-ku, Tokyo (JP)

(72) Inventors: Kenji Hata, Tsukuba (JP); Seisuke Ata, Tsukuba (JP); Kazufumi Kobashi, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 124 days.

(21) Appl. No.: 14/191,609

(22) Filed: Feb. 27, 2014

(65) Prior Publication Data

US 2014/0291589 A1  Oct. 2, 2014

Related U.S. Application Data

(63) Continuation of application No. PCT/JP2012/072188, filed on Aug. 31, 2012.

(30) Foreign Application Priority Data

Sep. 2, 2011 (JP) .................. 2011-191502

(51) Int. Cl.
*H01B 1/24* (2006.01)
*B82Y 30/00* (2011.01)
(Continued)

(52) U.S. Cl.
CPC ............... *H01B 1/24* (2013.01); *B82Y 30/00* (2013.01); *B82Y 40/00* (2013.01); *C01B 32/16* (2017.08);
(Continued)

(58) Field of Classification Search
CPC ............. H01B 1/04; H01B 1/24; B82Y 40/00
(Continued)

(56) References Cited

U.S. PATENT DOCUMENTS

2008/0048364 A1* 2/2008 Armeniades ........... B82Y 30/00
264/328.1
2008/0318049 A1  12/2008 Hata et al.
(Continued)

FOREIGN PATENT DOCUMENTS

| CN | 101604555 A | 12/2009 |
|---|---|---|
| JP | 2004-182548 A | 7/2004 |

(Continued)

OTHER PUBLICATIONS

Shin et al. ("Elastomeric Conductive Composites Based on Carbon Nanotube Forests." Adv Mater, 22, pp. 2663-2667, 2010).*

(Continued)

*Primary Examiner* — Tri V Nguyen
(74) *Attorney, Agent, or Firm* — Hauptman Ham, LLP

(57) ABSTRACT

Provide is a carbon nanotube composite material and conductive material to solve the problems of the prior art described above by providing a high conductivity and showing excellent durability against repeated stress such as strain. A carbon nanotube composite material of the invention is a conductive material having carbon nanotubes dispersed in a matrix including observing a peak in each region of 110±10 $cm^{-1}$, 190±10 $cm^{-1}$ and 200 $cm^{-1}$ or more in a Raman spectroscopic analysis at a wavelength of 633 nm, and a ratio $R/R_0$ of an electrical resistance R after a load of repeated stress of 100 times at 10% elongation with respect to an electrical resistance $R_0$ prior to applying a load is 5 or more. In addition, a conductive material of the invention comprises these characteristics of the carbon nanotube composite material.

15 Claims, 11 Drawing Sheets

(51) Int. Cl.
*C08K 3/04* (2006.01)
*B82Y 40/00* (2011.01)
*C01B 32/16* (2017.01)

(52) U.S. Cl.
CPC ............ *C08K 3/04* (2013.01); *C01B 2202/22* (2013.01); *C01B 2202/34* (2013.01); *C01B 2202/36* (2013.01); *C08K 2201/011* (2013.01)

(58) Field of Classification Search
USPC .................. 252/500–519.3; 423/445 R–448; 977/750, 783
See application file for complete search history.

(56) References Cited

U.S. PATENT DOCUMENTS

| 2009/0123731 | A1* | 5/2009 | Shimizu et al. | ............... 428/323 |
| 2012/0292578 | A1* | 11/2012 | Bacher | .................. B82Y 30/00 |
| | | | | 252/511 |
| 2014/0127490 | A1* | 5/2014 | Islam et al. | ................... 428/408 |

FOREIGN PATENT DOCUMENTS

| JP | 2005-220316 | A | 8/2005 |
| JP | 2008-198425 | A | 8/2008 |
| JP | 2008-230947 | A | 10/2008 |
| WO | 2006/011655 | A1 | 2/2006 |
| WO | 2009/102077 | A1 | 8/2009 |

OTHER PUBLICATIONS

Gao ("Application of Raman spectroscopy in carbon nanotube-based polymer composites." Chinese Sc Bull, 55, pp. 3978-3988, Dec. 2010).*
Xia ("Preparation and characterization of polyurethane-carbon nanotube composites." SoftMatter, 1, pp. 386-394, Oct. 2005).*
Kao (A Raman spectroscopic investigation of heating effects and the deformation behaviour of epoxy/SWNT composites. Developments in carbon nanotube and nanofibre reinforced polymers , Composites Science and Technology, 64(15):2291-2295, 2004).*
English translation of the International Preliminary Report on Patentability (Chapter II) dated Feb. 3, 2014 regarding PCT/JP2012/072188.
Tsuyoshi Sekitani et al., Science, "A Rubberlike Stretchable Active Matrix Using Elastic Conductors", Sep. 12, 2008, vol. 321, pp. 1468-1472.
International Search Report issued in PCT/JP2012/072188 dated Oct. 16, 2012.
International Preliminary Report on Patentability dated Oct. 17, 2012 for PCT International Application No. PCT/JP2012/072188, International Filing Date Aug. 31, 2012.
International Preliminary Examination Report dated Jul. 2, 2013 for PCT International Application No. PCT/JP2012/072188, International Filing Date Aug. 31, 2012.

* cited by examiner

FIG. 9

| | | Example | | | | | Comparative example | | |
|---|---|---|---|---|---|---|---|---|---|
| | | 1 | 2 | 3 | 4 | 5 | 1 | 2 | 3 |
| blending quantity | Rubber species | fluorocarbon rubber | fluorocarbon rubber | isoprene rubber | nitrile rubber | Hydrogenated Styrenic Thermoplastic Elastomer | fluorocarbon rubber | fluorocarbon rubber | nitrile rubber |
| | Rubber weight ratio (wt%) | 90 | 99 | 90 | 90 | 90 | 90 | 90 | 90 |
| | CNT species | CNT by the present production method | CNT by the present production method | CNT by the present production method | CNT by the present production method | CNT by the present production method | HPCO | Nanocyl | HPCO |
| | CNT weight ratio (wt%) | 10 | 1 | 10 | 10 | 10 | 10 | 10 | 10 |
| evaluation result | 100 times repeated R/R₀ | 1.25 | 1.15 | 1.06 | 1.16 | 1.27 | 5.56 | 3.50 | 4.80 |
| | Raman peak value (cm⁻¹) | 111.1 135.1 192.4 249.1 279.7 | 111.1 135.1 192.3 249.1 279.7 | 110.9 135.9 191.5 249.7 280.2 | 108.9 135.7 191.8 250.0 280.5 | 109.2 135.8 192.3 249.8 280.1 | 192.9 215.5 253.2 279.9 291.5 | No peak | 192.3 214.2 251.1 277.4 290.9 |
| | Raman peak value (cm⁻¹) | 1599.1 1320.6 | 1599.1 1320.6 | 1587.7 1318.3 | 1587.4 1319.7 | 1586.7 1319.2 | 1586.2 1333.3 | 1600.4 1327.3 | 1587.7 1332.1 |
| | G/D ratio | 4.5 | 4.5 | 3.3 | 5.6 | 6.6 | 12.1 | 6.53 | 12.0 |
| | Volume conductivity (S/cm) | 30 | 5.2 | 3.4 | 4.8 | 2.2 | 2.8 | 5.2 | 0.8 |
| | 10% strain conductivity (S/cm) | 24 | 4.5 | 2.0 | 2.8 | 1.5 | 1.4 | 2.5 | 0.3 |
| | Permanent strain (%) | 68.4 | 48 | 43 | 51 | 24.6 | 32 | 49.7 | 52 |
| | Elastic modulus (MPa) | 9.1 | 4.5 | 4.8 | 1.8 | 9.5 | 3.0 | 4.3 | 5.2 |
| | CNT average length (nm) | 3.0 | 3.0 | 3.0 | 3.0 | 3.0 | 0.8-1.2 | 9.5 | 0.8-1.2 |
| | CNT purity (%) | 99.98 | 99.98 | 99.98 | 99.98 | 99.98 | 70.0 | 90.0 | 70 |

CARBON NANOTUBE COMPOSITE MATERIAL AND CONDUCTIVE MATERIAL

CROSS REFERENCE TO RELATED APPLICATIONS

This application is based upon and claims the benefit of priority from the prior Japanese Patent Application No. 2011-191502, filed on Sep. 2, 2011 and PCT Application No. PCT/JP2012/072188, filed on Aug. 31, 2012, the entire contents of which are incorporated herein by reference.

FIELD

The present invention relates to a carbon nanotube composite material dispersed in a matrix of carbon nanotubes and a conductive material comprising the carbon nanotube composite material.

BACKGROUND

A carbon nanotube composed of only carbon atoms is a material having excellent electrical properties, thermal conductivity and mechanical properties. Carbon nanotubes are extremely lightweight, very tough and have excellent elasticity and restoration properties. Carbon nanotubes having excellent properties as described above are an attractive substance and very important as an industrial material.

A carbon nanotube composite material and conductive material obtained by blending a conductive filler in a polymer foam and elastomer are widely used in a variety of applications, for example, as a gasket and seal for providing electromagnetic shielding and/or electrostatic dissipation in electronic products, computers, and medical devices. In the past, electrical conductivity was usually provided by using fine particles such as metal or carbon black. As the increase in the miniaturization of electronic components and use of plastic parts, a carbon nanotube composite material and conductive material having a higher conductivity have been required in consumer electronics in particular. Therefore, carbon nanotubes having excellent conductivity are attracting attention as a conductive filler.

For example, when carbon nanotubes having carbon fibers extending three-dimensionally (radially) from a center portion are incorporated into an elastomer, the specific carbon nanotubes described above derive from this three-dimensional shape and as a result of being uniformly dispersed in the elastomer, a continuous conductive path is formed in the entire elastomer and flexible electrodes having excellent electrical conductivity are realized (Japanese Laid Open Patent No. 2008-198425).

In addition, a carbon nanotube composite material and conductive material including a carbon nanotube rubber composition comprised from a carbon nanotubes, an ionic liquid and rubber having miscibiloity with the ionic liquid has a sufficient conductivity of 1 S/cm or more and elongation of 10% or more for use as a material in electronic circuits and was used as wiring in stretchable electronic devices which can be used as flexible electronics (International Publication WO2009/102077).

However, because a conductive filler of the carbon nanotube composite material and conductive material according to these prior art can not completely follow the deformation of a matrix when stress such as strain is applied repeatedly, there is a problem whereby the structure of the conductive path of the conductive filler in the matrix gradually and irreversibly changes which deteriorates conductivity. For example, in the case of a carbon nanotube composite material and conductive material using the ionic liquid, carbon nanotubes and rubber described above, the ionic liquid is adsorbed around the carbon nanotubes, and carbon nanotubes are well dispersed in the matrix. However, when ionic liquid is present in a liquid state at the interface of the carbon nanotubes and the rubber, good stress transfer of the carbon nanotubes and rubber is prevented. As a result, in the case where repeated stress is applied, the ionic liquid begins to seep and the interface between the carbon nanotube and rubber structurally changes and conductivity deteriorates. Therefore, in Tsuyoshi Sekitani et al, A Rubberlike Stretchable Active Matrix Using Elastic Conductors, SCIENCE, 2008.9.12, vol. 321, p. 1468-1472, by opening a plurality of holes by punching the carbon nanotube composite material and conductive material and covering the carbon nanotube composite material and conductive material with a PDMS rubber, mechanical durability is improved.

In this way, a carbon nanotube composite material and conductive material having a high conductivity and excellent mechanical durability without any special treatment does not exist in practice and thus the appearance of this type of carbon nanotube composite material and conductive material is desired.

SUMMARY

The present invention aims to provide a carbon nanotube composite material and conductive material to solve the problems of the prior art described above by providing a high conductivity and showing excellent durability against repeated stress such as strain.

According to one embodiment of the present invention, a carbon nanotube composite material having carbon nanotubes dispersed in a matrix is provided including observing a peak in each region of $110 \pm 10$ cm$^{-1}$, $190 \pm 10$ cm$^{-1}$ and 200 cm$^{-1}$ or more in a Raman spectroscopic analysis at a wavelength of 633 nm, and a ratio $R/R_0$ of an electrical resistance R after a load of repeated stress of 100 times at 10% elongation with respect to an electrical resistance $R_0$ prior to applying a load is 5 or more.

The carbon nanotube composite material has conductivity of 0.01 S/cm or more at 10% elongation.

In the carbon nanotube composite material, a contained amount of the carbon nanotubes is 0.001% by mass or more and 70% by mass in the case where the mass of the entire carbon nanotube composite material is 100% by mass.

The carbon nanotube composite material includes carbon nanotubes having conductivity of 1 S/cm or more and conductivity of the carbon nanotube composite material itself is 0.01 S/cm or more.

Permanent elongation of the carbon nanotube composite material is less than 60%.

An elastic modulus of the carbon nanotube composite material is 0.1M Pa or more and 300 MPa or less.

In the carbon nanotube composite material, a length of the carbon nanotubes is 0.1 μm or more.

In the carbon nanotube composite material, an average diameter of the carbon nanotubes is 1 nm or more and 30 nm or less.

In the carbon nanotube composite material, carbon purity according to an analysis using fluorescence X-rays of the carbon nanotube is 90% by weight or more.

In the carbon nanotube composite material, a G/D ratio of the carbon nanotubes is 3 or more when a maximum peak intensity in the range of 1560 cm$^{-1}$ or more and 1600 cm$^{-1}$ or less is G and a maximum peak intensity in the range of 1310 cm$^{-1}$ or more and 1350 cm$^{-1}$ or less is D in a spectrum obtained in a measurement performed by a resonance Raman scattering measurement method.

In the carbon nanotube composite material, the matrix is an elastomer.

In the carbon nanotube composite material, the elastomer is one type or more selected from nitrile rubber, chloroprene rubber, chloro-sulfonated polyethylene, urethane rubber, acrylic rubber, epichlorohydrin rubber, fluorocarbon rubber, styrene—butadiene rubber, isoprene rubber, butadiene rubber, butyl rubber, silicone rubber, ethylene—propylene copolymer, and ethylene—propylene—diene terpolymer.

In the carbon nanotube composite material, the matrix includes a fluorocarbon rubber.

In the carbon nanotube composite material, the matrix is a resin.

In the carbon nanotube composite material, the resin is formed from at least one of silicone-based resins, modified silicone-based resins, acrylic-based resins, chloroprene-based resins, polysulfide-based resins, polyurethane-based resins, polyisobutyl-based resin and a fluorosilicone-based resin.

In addition, according to one embodiment of the present invention a conductive material comprising any one of the above described carbon nanotube composite materials is provided.

BRIEF EXPLANATION OF THE DRAWINGS

FIG. 9 is a table showing the characteristics of a carbon nanotube composite material according to one example of the present invention.

EXPLANATION OF THE SYMBOLS

Figure 1:
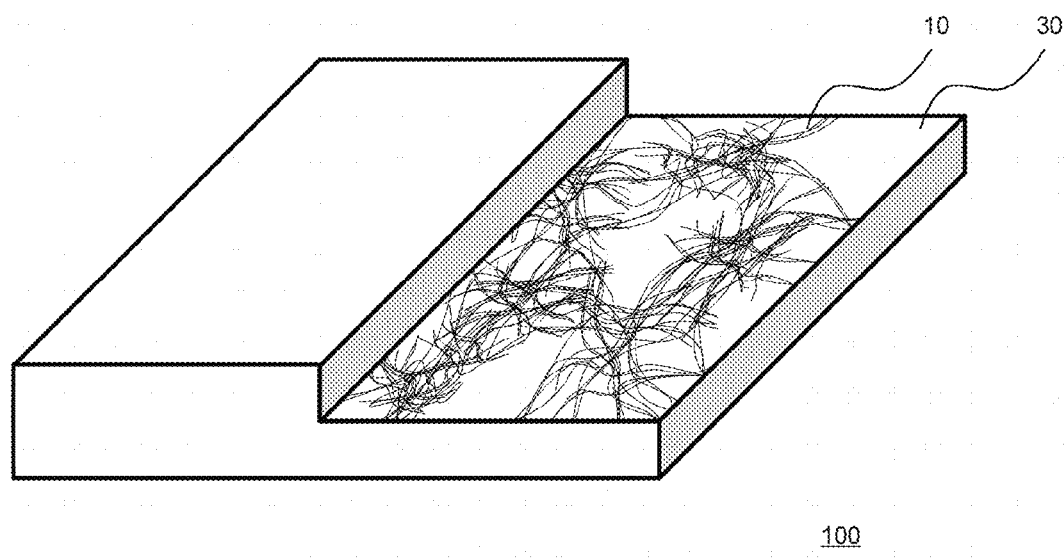
FIG. 1 is a schematic diagram of a carbon nanotube composite material 100 according to one embodiment of the present invention.

10 carbon nanotubes, 30 matrix, 100 carbon nanotube composite material, 200 carbon nanotube composite material, 210 carbon nanotube composite material, 230 carbon nanotube composite material, 250 carbon nanotube composite material, 270 carbon nanotube composite material, 500 manufacturing equipment, 501 substrate, 503 catalyst layer, 505 substrate holder, 510 synthesis furnace, 521 gas flow formation means, 530 heating means, 531 heating region, 541 first gas supply pipe, 543 second gas supply pipe, 545 first gas flow path, 547 second gas flow path, 550 gas exhaust pipe, 555 pipe, 557 pipe, 561 source gas cylinder, 563 atmosphere gas cylinder, 656 reduction gas cylinder, 567 catalyst activator cylinder, 571 first carbon flux weight adjustment means, 573 second weight carbon flux adjustment means, 580 gas mixing area, 900 carbon nanotube composite material, 910 carbon nanotube composite material, 930 carbon nanotube composite material

DESCRIPTION OF EMBODIMENTS

A carbon nanotube composite material and conductive material according to the present invention is explained below while referring to the drawings. The carbon nanotube composite material and conductive material of the present invention is not to be interpreted as being limited to the description of the embodiments and examples below. Furthermore, in the drawings referenced in the present embodiment and Examples described below, the same reference numerals are given to the same parts or parts having similar functions and repetitive descriptions are omitted.

The carbon nanotube composite material according to the present invention has carbon nanotubes dispersed in a matrix. The carbon nanotube composite material of the present invention has high conductivity as described herein and can be used as a conductive material since it has excellent durability against repeated stress such as strain. FIG. 1 is a schematic diagram of a carbon nanotube composite material 100 according to one embodiment of the present invention and shows a cut part of the carbon nanotube composite material 100 exposing the interior. In the carbon nanotube composite material 100, carbon nanotubes 10 are dispersed in a matrix 30.

The carbon nanotube composite material according to the present invention has carbon nanotubes with the characteristics described below dispersed in the matrix and it is possible to extract only the carbon nanotubes from the carbon nanotube composite material and perform an evaluation using Bucky paper.

[Raman Spectrum]

A carbon nanotube composite material containing carbon nanotubes with the peak of each observed region of 110±10 cm$^{-1}$, 190±10 cm$^{-1}$ and 200 cm$^{-1}$ or more in a Raman spectroscopic analysis at a wavelength of 633 nm is suitable for obtaining the effects of the present invention. The structure of the carbon nanotubes can be evaluated by Raman spectroscopy. Although there are various laser wavelengths used in the Raman spectroscopy method, wavelengths of 633 nm and 532 nm are used here. A Raman spectrum area of 350 cm$^{-1}$ or less is called a radial breathing mode (hereinafter, referred to as RBM), and the peaks observed in this region is correlated with the diameter of the carbon nanotubes.

Carbon nanotubes and a carbon nanotube composite material according to the present invention have peaks across a broad wavelength range and the peak of each observed region of $110\pm10$ cm$^{-1}$, $190\pm10$ cm$^{-1}$ and 200 cm$^{-1}$ or more in a Raman spectroscopic analysis at a wavelength of 633 nm. In addition to the above, and more preferably, peaks of $135\pm10$ cm$^{-1}$, $250\pm10$ cm$^{-1}$ and $280\pm10$ cm$^{-1}$ are preferred. That is, because carbon nanotubes having such Raman peaks are composed of carbon nanotubes having greatly different diameters, carbon nanotubes having greatly different diameters cannot be densely packed between carbon nanotubes, the interaction between such carbon nanotubes is relatively weak and very good dispersibility is exhibited. As a result, because it is possible to easily disperse carbon nanotubes in a matrix without cutting the carbon nanotubes using ultrasonic waves for example, the original characteristics of the carbon nanotubes can be sufficiently provided to the matrix. That is, because it is possible control damage to the carbon nanotubes to a minimum when these carbon nanotubes are dispersed carbon nanotubes in a matrix, it is possible to obtain a carbon nanotube composite material having a high conductivity by blending a small amount of carbon nanotubes.

In addition, because mutual interactions that form and hold a bundle of carbon nanotubes is relatively weak and the bundle of carbon nanotubes in the matrix is easily deformed, cracks or breakage in the carbon nanotube bundles in the matrix can be prevented even when stress such as strain is repeated.

Because the wavenumber of Raman spectroscopy varies depending on the measurement conditions, here the specified wavenumber is prescribed in wavenumber range of $\pm10$ cm$^{-1}$. In the case where there is a peak at exactly 200 cm$^{-1}$ for example, this also enters the range of either $190\pm10$ cm$^{-1}$ and 200 cm$^{-1}$ or more. In this case, it is considered that a peak is present in a range of both $190\pm10$ cm$^{-1}$ and 200 cm$^{-1}$ or more. Furthermore, in the case where the assignment of peaks is considered by the correlation of the peak of the Raman spectrum and the diameter of the carbon nanotubes in accordance with the thinking hereafter, it is also possible to interpret that the peak is attributable to only one of the ranges due to the relation with the other peaks. For example, in the case where a peak already exists in $190\pm10$ cm$^{-1}$ or more and 200 cm$^{-1}$ and a peak does not exist at 200 cm$^{-1}$ or more and other than 200 cm$^{-1}$, a peak of 200 cm$^{-1}$ can be interpreted as a peak of 200 cm$^{-1}$ or more.

[Electrical Conductivity of Carbon Nanotube Composite Materials]

The carbon nanotube composite material of the present invention preferably has a conductivity of 0.01 S/cm or more and more preferably 0.1 S/cm or more and even more preferably 1 S/cm or more. Although, there is no particular upper limit to the electrical conductivity, it is not possible to surpass $10^4$ S/cm conductivity of carbon materials.

The carbon nanotube composite material of the present invention preferably has conductivity of 0.01 S/cm or more and more preferably 0.1 S/cm or more and even more preferably 1 S/cm or more at an elongation of 50% without deterioration in conductivity. Although, there is no particular upper limit to the electrical conductivity, it is not possible to surpass $10^4$ S/cm conductivity of carbon materials.

[Electrical Conductivity of Carbon Nanotube]

Conductivity of the carbon nanotubes used in the carbon nanotube composite material of the present invention is preferably 1 S/cm or more, more preferably 10 S/cm or more and even more preferably 50 S/cm or more. Carbon nanotubes having this conductivity are preferred in order to obtain a carbon nanotube composite material with a high conductivity.

[Electrical Resistance Ratio of Carbon Nanotube Composite Material]

The carbon nanotube composite material of the present invention has a ratio $R/R_0$ of an electrical resistance R after a load of repeated stress of 100 times at 10% elongation with respect to an electrical resistance $R_0$ prior to applying the load of 3 or less, more preferably 2.5 or less, even more preferably 2 or less and more preferably 1.5 or less. A carbon nanotube composite material having such characteristics can exhibit excellent durability against repeated stress. Although the lower limit is not particularly limited, it is technically difficult to obtain a $R/R_0$ with a value of $10^{-3}$ or less at repeated elongation.

[Permanent Elongation]

Permanent elongation of the carbon nanotube composite material of the present invention is less than 60% and preferably 30% or less. That is, when permanent elongation is 60% or less, the shape of the carbon nanotube composite material is changed by stretching several times and it is not possible for excellent durability to be shown against repeated stress. Furthermore, the permanent elongation of the carbon nanotube composite material of the present invention is measured at 40° C. in accordance with standard JIS K 6262.

[Elastic Modulus]

Elastic modulus of the carbon nanotube composite material of the present invention is in the range of 0.1 or more and 300 MPa or less and preferably in the range of 0.1 or more and 100 MPa or less. That is, when the elastic modulus exceeds the upper limit described above, flexibility is lost and it is difficult to obtain the effects of the present invention. Furthermore, the elastic modulus of the carbon nanotube composite material of the present invention is measured according to standard JIS K 6254.

[Amount of Carbon Nanotubes]

From the viewpoint of stability of conductivity when stretched, a preferred contained amount of carbon nanotubes of the carbon nanotube composite material of the present invention is 0.001% by mass or more and 70% by mass or less, and more preferably 0.05% by mass or more and 50% by mass or less when the total mass of the carbon nanotube composite material is given as 100%. When the amount of the carbon nanotubes exceeds 70%, the preferred elastic modulus and permanent elongation of the carbon nanotube composite material of the present invention can no longer be obtained.

[Properties of Carbon Nanotubes]

The properties of carbon nanotubes used in the carbon nanotube composite material of the present invention can be evaluated by extracting only the carbon nanotubes from the carbon nanotube composite material and, for example, using a Buckypaper. The extraction can be performed by appropriately using a known means such as dissolving a matrix using a solvent. The length of the carbon nanotubes used in the carbon nanotube composite material of the present invention is 0.1 μm or more, more preferably 0.5 μm or more, and 1 μm or more is further preferred. Because these carbon nanotubes have excellent deformability and are deformed by following the deformation of the matrix, they can exhibit excellent durability against repeated stress such as strain.

The average diameter of the carbon nanotubes used in the carbon nanotube composite material of the present invention is in the range of 1 nm or more and 30 nm or less, and preferably in the range of 1 nm or more and 10 nm or less. If the average diameter is too small, cohesion is too strong they do not disperse. If the average diameter is too large, the carbon nanotubes can become hard thereby cannot deform following the deformation of the matrix and it is not possible to exhibit excellent durability against repeated stress. Furthermore, the average diameter of the carbon nanotubes used in the carbon nanotube composite material of the present invention is calculated from a histogram formed by measuring the exterior diameter of each carbon nanotube one by one from a transmission electron microscopy image (hereinafter referred to as TEM) of a carbon nanotube aligned aggregate before being dispersed in a matrix.

The carbon purity measured by analysis using fluorescence X-rays of the carbon nanotubes used in the carbon nanotube composite material of the present invention is 90% by weight or more, more preferably 95% by weight or more, and 98% by weight or more is further preferred. Because the carbon nanotubes with a high purity have excellent deformability and deform by following the deformation of the matrix, they can exhibit excellent durability against repeated stress such as strain. Furthermore, carbon purity indicates what percentage of the weight of the carbon nanotubes is composed of carbon and the carbon purity of the carbon nanotubes used in the carbon nanotube composite material of the present invention is calculated from an element analysis by fluorescence X-rays.

Carbon nanotubes used for the carbon nanotube composite material of the present invention are preferred to have a G/D ratio of 3 or more when a maximum peak intensity in the range of 1560 $cm^{-1}$ or more and 1600 $cm^{-1}$ or less is G and a maximum peak intensity in the range of 1310 $cm^{-1}$ or more and 1350 $cm^{-1}$ or less is D in a spectrum obtained in a measurement performed by a resonance Raman scattering measurement method. The carbon nanotubes used in the carbon nanotube composite material of the present invention, in which graphene sheet defects are small, are preferred since quality and conductivity increases. Defects in a graphene sheet can be evaluated by Raman spectroscopy. Although there are various laser wavelengths used in the Raman spectroscopy method, wavelengths of 532 nm and 633 nm are used here. In the Raman spectrum, a Raman shift observed near 1590 $cm^{-1}$ is called a G band derived from graphite and a Raman shift observed near 1350 $cm^{-1}$ is called a D band derived from amorphous carbon and defects in graphite. In order to measure the quality of the carbon nanotubes, the height ratio of the G band and D band (G/D ratio) by Raman spectroscopy are used. The higher the G/D ratio of the carbon nanotubes, the carbon nanotubes have the higher degree of graphitization is and are higher quality. When evaluating the Raman G/D ratio, a wavelength 532 nm is used here. Although it is better the higher the G/D ratio is, a ratio of 3 or more is preferred since the conductivity is sufficiently high in the carbon nanotubes included in the conductive material and a carbon nanotube composite material of high electrical conductivity is obtained. The G/D ratio is preferably 4 or more and 200 or less and 5 or more and 0.99 or less is more preferred. In addition, the Raman spectroscopy analysis method of a solid such as carbon nanotubes may vary depending on sampling. Therefore Raman spectroscopic analysis is performed at least three locations and at different locations and taking the arithmetic average.

The carbon nanotubes used in the carbon nanotube composite material of the present invention are preferred to be single-walled carbon nanotubes. Single-walled carbon nanotubes are preferable since they have excellent deformability and deform by following the deformation of a matrix.

[Matrix]

An elastomer is preferred for the matrix used in the carbon nanotube composite material of the present invention. An elastomer is preferable since it has excellent deformability. Examples of elastomers that can be applied to the carbon nanotube composite of the present invention can be selected from one or more from nitrile rubber (NBR), chloroprene rubber (CR), chloro-sulfonated polyethylene, urethane rubber, acrylic rubber, epichlorohydrin rubber, fluorocarbon rubber, styrene—butadiene rubber (SBR), isoprene rubber (IR), butadiene rubber (BR), butyl rubber, silicone rubber, ethylene—propylene copolymer, an ethylene—propylene—diene terpolymer (EPDM) and the like in terms of flexibility, conductivity and durability. Elastomers used in the carbon nanotube composite material of the present invention may also be cross-linked to one or more selected from the group above.

A fluorocarbon rubber is particularly preferred as the matrix used in the carbon nanotube composite material of the present invention. Fluorocarbon rubber is preferred since the dispersibility in the carbon nanotubes is high and the carbon nanotubes and matrix deform by following their mutual deformation.

In addition, a resin may be used as the matrix used in the carbon nanotube composite material of the present invention. The resin that can be applied to the carbon nanotube composite material of the present invention is selected from one more of silicone-based resins, modified silicone-based resins, acrylic-based resins, chloroprene-based resins, polysulfide-based resins, polyurethane-based resins, polyisobutyl-based resins, fluorosilicone-based resins for example.

Although the cross-linking agent varies depending on the type of elastomer described above, for example, isocyanate group-containing crosslinking agents (isocyanate, blocked isocyanate, etc.), sulfur-containing crosslinking agent (such as sulfur), a peroxide crosslinking agent (peroxide, etc.), hydrosilyl group-containing crosslinking agent (hydrosilylation curing agent, etc.), a urea resin such as melamine, epoxy curing agent, polyamine curing agent and, photocrosslinking agents which generate radicals by the energy of ultraviolet rays or an electron beam and the like may be used. These may be used alone or two or more may be used.

Furthermore, apart from the components described above, an ion conductive agent (surfactants, ammonium salts, inorganic salts), plasticizers, oils, cross-linking agents, cross-linking accelerators, antioxidants, flame retardants, colorants and the like may be appropriately used in the carbon nanotube composite material of the present invention.

In the carbon nanotube composite material of the present invention, dispersing carbon nanotubes in a matrix without using the ionic liquid is preferred. When carbon nanotubes are dispersed in a matrix using an ionic liquid, ions affect the matrix, and it becomes impossible to secure sufficient a flexibility and durability required for the carbon nanotube composite material.

[Use of Carbon Nanotube Composite Materials]

Since it has highly conductivity and has excellent durability against repeated stress such as strain, the carbon nanotube composite material of the present invention can be used as a conductive material for example, electronics such as actuators, sensors and transducers and can be used in a solar cell, an organic EL or the like.

[Manufacturing Method]

A manufacturing method of the carbon nanotube composite material of the present invention is explained below. The carbon nanotube composite material of the present invention can be obtained by dispersing carbon nanotubes having the characteristics described above in a matrix.

[Manufacture of Carbon Nanotubes]

Figure 2A:
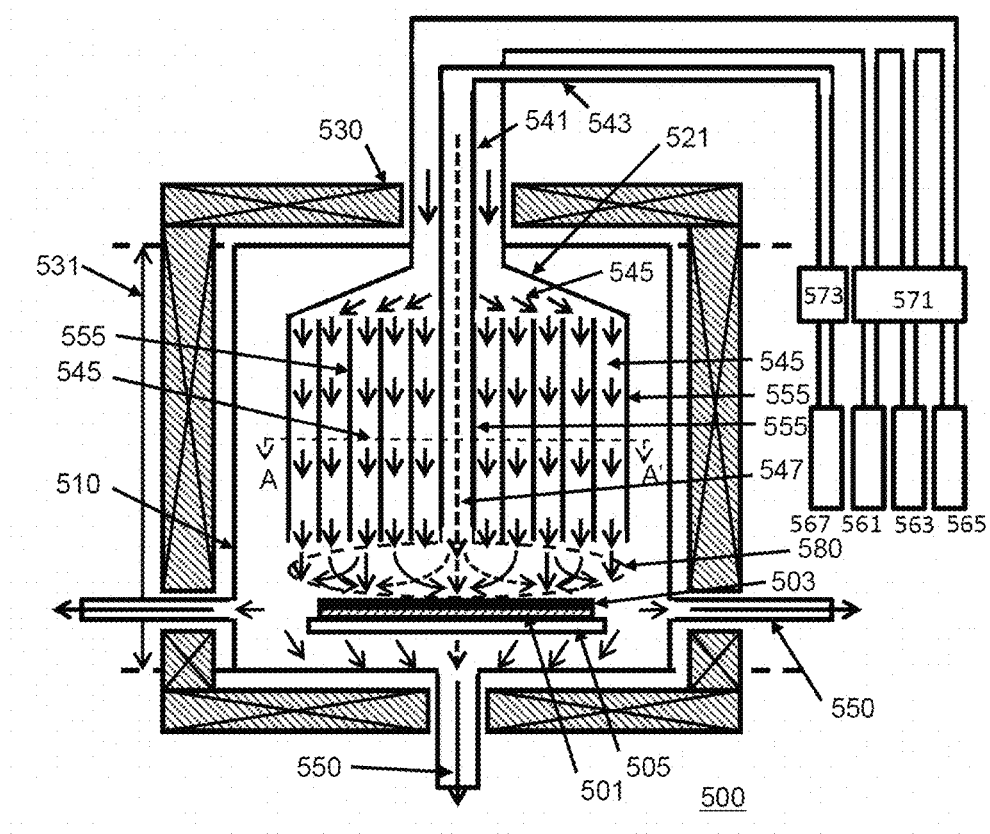
FIG. 2A is a schematic diagram of a manufacturing device used for manufacturing the carbon nanotube composite material according to one embodiment of the present invention.
Figure 2B:
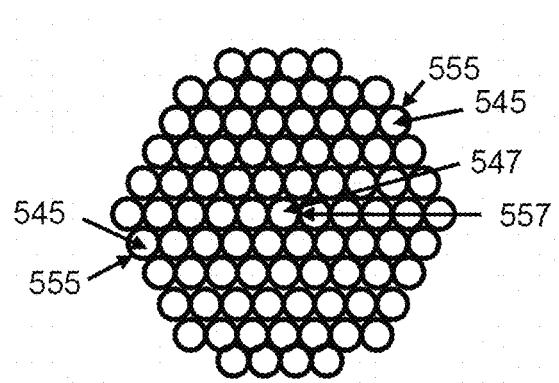
FIG. 2B is a schematic diagram of a manufacturing device used for manufacturing the carbon nanotube composite material according to one embodiment of the present invention.

Carbon nanotubes used in the carbon nanotube composite material of the present invention can be manufactured by chemical vapor deposition using the apparatus 500 shown in FIG. 2. In this manufacturing method, a first gas including a source gas and a second gas including a catalyst activation material are supplied from separate gas supply pipes, a gas path formed by separate pipes in a heating area is flown, source gas and catalyst activator material are supplied without mixing and reacting before reaching the vicinity of a catalyst layer and since it is possible to mix the first gas and second gas in the vicinity of the catalyst layer and make contact with the catalyst layer, catalyst activity which is usually only a few percent can be very high. This significantly improved catalytic activity is presumed to allow synthesis of carbon nanotubes at very high efficiency and uniformly from nanometer size fine catalyst particles with different multiple sizes that were generated on an alumina layer by reducing the catalyst. In general, the size of the catalyst and the diameter of carbon nanotubes correlate (match).

That is, according to the manufacturing method of the present invention, it is possible to manufacture an aggregate of carbon nanotubes composed of carbon nanotubes efficiently in a large area with a several different diameters having a peak over a wide wavelength range in the Raman spectroscopic analysis from nanometer size catalyst fine particles of different multiple sizes that were generated on an alumina layer.

First, a substrate 501 (silicon wafer for example) grown with a catalyst layer 503 (alumina iron thin film for example) in advance is placed into a substrate holder 505 and transferred to the interior of a synthesis furnace 510 which is filled with an atmosphere gas (helium for example) supplied from a first gas supply pipe 541 via a first gas path 545. The substrate 501 is arranged so that the surface of the catalyst layer 503 and the first flow path 545 and second flow path 547 intersect in a roughly perpendicular direction and the source gas is efficiently supplied to the catalyst.

Next, the interior of the synthesis furnace 510 is heated to a certain temperature (750° C. for example) while supplying a reduction gas (hydrogen for example) to the interior of the synthesis furnace 510 from the first gas supply pipe 541 via the first gas flow path 545 and maintained in this state for a desired time period.

The catalyst layer 503 is transformed into microparticles having various sizes by this reduction gas and is adjusted to a suitable state as a catalyst for carbon nanotubes.

Next, the supply of the reduction gas and atmosphere gas from the first gas supply path 545 is stopped or reduced according to a desired reaction condition, a source gas and catalyst activator material are each supplied from a different pipe arranged within the synthesis furnace 501 to a gas mixing area 580 near the catalyst layer 503. That is, first gas including a source gas (ethylene for example) and an atmosphere gas are supplied to the interior of the synthesis furnace 510 from the first gas supply pipe 541 via the first gas flow path 545 and a second gas including the catalyst activator material (water for example) is supplied to the interior of the synthesis furnace 510 from the second gas supply pipe 543 via the second gas flow path 547. These gases which are supplied from the first gas flow path 545 and second gas flow path 547 are mixed in the gas mixing area 580 near the catalyst layer 503 after forming a gas flow directed in a roughly parallel direction to the surface of the catalyst layer 503 of the substrate 501 and supplied to the surface of the catalyst layer 503 on the substrate 501 at a certain amount.

Here, the decomposition reaction of the source gas contained in the first gas proceeds while passing through the first gas flow path 545 and becomes a suitable state for manufacture of the carbon nanotubes. In addition, by being supplied from the second gas flow path 547, the catalyst activator material of a predetermined amount is supplied to the gas mixing area 580 without reacting with the source gas. Because first gas and the second gas optimized in this way are contacted with the catalyst layer 503 by mixing in the gas mixing area 580, the catalytic activity which is usually only a few percent becomes 90% or more. Therefore, it is possible to synthesize carbon nanotubes at a very high efficiency from a catalyst with a variety of different sizes. Since the size of the catalyst and the diameter of the carbon nanotubes are usually correlated (match), it is possible to manufacture an aggregate of carbon nanotubes composed of carbon nanotubes efficiently in a large area with a several different diameters having a peak over a wide wavelength range in the Raman spectroscopic analysis from nanometer size catalyst fine particles of different multiple sizes rapidly, efficiently and with a high yield from a catalyst layer attached to the substrate 501.

After the manufacture of the carbon nanotubes is completed, only an atmosphere gas is flown from the first gas flow path 545 in order to suppress adherence of a source included in the first gas, catalyst activator material included in the second gas, or a decomposition product thereof remaining in the synthesis furnace 510 or carbon impurities present in the synthesis furnace 510 to the aggregate of carbon nanotubes.

The carbon nanotube aggregate, catalyst and the substrate 501 are cooled to 400° C. or less and more preferably to 200° C. or less in a cooling gas environment. An inert gas supplied from the second gas supply pipe 543 is preferred as the cooling gas, and in particular nitrogen is preferred from the viewpoint of safety, economy and purging properties. In this way, it is possible to manufacture carbon nanotubes for use in the carbon nanotube composite material of the present invention.

[Base Material (Substrate)]

The substrate 501 is a component which can support a catalyst for growing carbon nanotubes on the surface thereof and as long as it can maintain a shape even at a minimum high temperature of 400° C., an appropriate substrate may be used.

A planar flat plate or the like is preferred as the form of the substrate 501 to manufacture a large amount of carbon nanotubes using the effects of the present invention.

[Catalyst]

Although it is possible to use an appropriate catalyst as long as it has proven results in the manufacture of carbon nanotubes so far as the catalyst for forming the catalyst layer 503, specifically, iron, nickel, cobalt, molybdenum and their chlorides, an alloy, composite or stratified product of these with aluminium, alumina, titanium, titanium nitride or silicon oxide may be used.

The amount of catalyst present may be within a range with proven results in the manufacture of carbon nanotubes so far, however, in the case of using a thin metal film of iron or nickel, a thickness of 0.1 nm or more and 100 nm or less is preferred, more preferably 0.5 nm or 5 nm or less and 0.8 nm or more and 2 nm or less is particularly preferable.

[Reduction Gas]

A reducing gas is a gas that has the effect of at least one of reducing a catalyst, promoting microparticulation suitable for growth of carbon nanotubes and improvement of catalyst activity. It is possible to apply hydrogen, ammonia, water, and a mixed gas thereof for example as the reducing gas with proven results in the manufacture of carbon nanotubes so far.

[Inert Gas (Atmospheric Gas)]

An atmospheric gas (carrier gas) in chemical vapor deposition is inert at a growth temperature of carbon nanotubes, and may be any gas that does not react with carbon nanotubes to be grown, an inactive gas is preferred with proven results in the manufacture of carbon nanotubes so far such as nitrogen, helium, argon, hydrogen, and mixtures of these gases.

[Raw Material (Source Gas)]

It is possible to use a suitable material as the source gas with proven results in the manufacture of carbon nanotubes so far. Hydrocarbons such as methane, ethane, propane, butane, pentane, hexane, heptane, propylene, ethylene, butadiene, polyacetylene, and acetylene are preferred as the source gas.

[Addition of a Catalyst Activator]

A catalyst activation material is added in the growth process of carbon nanotubes. By the addition of the catalyst activator it is possible to extend the life of the catalyst, increase the activity and promote production efficiency and high purification of carbon nanotubes as a result. A substance having an oxidizing power such as oxygen or sulfur, and the substance which does not give significant damage to the carbon nanotube growth temperature such as water, oxygen, carbon dioxide, carbon monoxide, ethers, alcohols are preferred, especially water is readily available very suitable as the catalyst activator.

[Conditions of Catalyst Activator and Raw Materials]

In the manufacture of carbon nanotubes using a catalyst activator and raw material, including (1) a material containing carbon but no oxygen and (2) a catalyst activator including oxygen is preferred for manufacturing carbon nanotubes with high efficiency. As described above, the first gas including a source gas is supplied to the synthesis furnace 510 via the first gas flow path 545 and a second gas containing the catalyst activator (eg, water) is supplied to the synthesis furnace 510 via the second gas flow path 547. In this way, decomposition reaction of the source gas proceeds when it passes through the first gas flow path 545 which is a suitable state for the manufacture of carbon nanotubes. In addition, by being supplied from the second gas flow path 547, a catalyst activator of a predetermined amount is supplied to the gas mixing area 580 without reacting with the source gas. By mixing the first gas and the second gas optimized in this way in the gas mixing area 580 and contacting with the catalyst layer 503, it is possible to manufacture carbon nanotubes having a peak over a wide wavelength range by Raman spectroscopy analysis with high efficiency.

[Reaction Temperature]

The reaction temperature for growing carbon nanotubes is preferred to be 400° C. or more and 1000° C. or less. Less than 400° C. and the effects of the catalyst activation material are not exhibited and exceeding 1000° C. the catalyst activator material reacts with the carbon nanotubes.

[Dispersion of Carbon Nanotubes]

Figure 3:
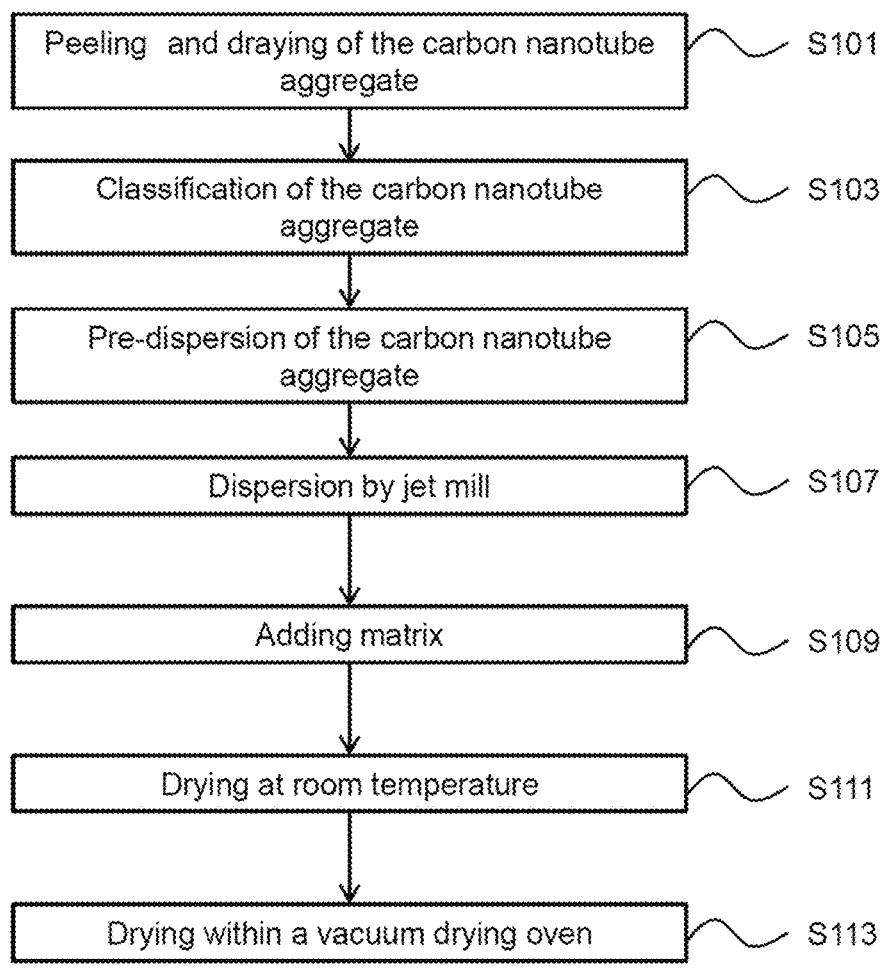
FIG. 3 is a flowchart showing a manufacturing process of the carbon nanotube composite material according to one example of the present invention.

Next, a method of manufacturing a carbon nanotube composite material using the obtained carbon nanotube aggregate is described with reference to FIG. 3. The carbon nanotube aggregate is peeled from the substrate 501 using a physical, chemical or mechanical method (S101). A peeling method using an electrical field, magnetic field, centrifugal force and surface tension force, a direct peeling method for mechanically peeling from the substrate or a peeling method using pressure or heat may be used as the peeling method. In addition, a method for peeling the carbon nanotube aggregate from a substrate using a thin knife such as cutter blade may be used or a method of peeling from the substrate by sucking the carbon nanotube aggregate using a vacuum pump is preferred.

A drying process is performed on the peeled carbon nanotube aggregate (S101). Dispersibility is increased by performing the drying process which is suitable for manufacturing the carbon nanotube composite material according to the present invention. Because carbon nanotubes which form the carbon nanotubes aggregate used in the carbon nanotube composite material of the present invention are formed from carbon nanotubes having several different diameters, it is easy to adsorb moisture within the atmosphere between the carbon nanotubes during storage and transport in an atmosphere. Because pairs of carbon nanotubes stick together due to water surface tension in a state where the water component is adsorbed, it is very difficult for the carbon nanotubes to unwind and good dispersion properties in a matrix cannot be obtained. Thus, by performing a drying process of the carbon nanotubes before a dispersion process, the water component included in the carbon nanotubes is removed and it is possible to increase the dispersion properties to a dispersion medium. It is possible to use a heat dryer or vacuum dryer for example in the drying process and heat vacuum drying is preferably used.

It is preferred that the peeled carbon nanotube aggregate is classified by a classification process (S103). The classification process is a process to obtain a uniform sized carbon nanotube aggregate by setting the size of the carbon nanotube aggregate within a certain range. The carbon nanotube aggregate which is peeled from the substrate 501 also includes synthesized components with a large clump shaped size. Since the dispersion properties of the carbon nanotube aggregate including these large sized clumps is different, the formation of a stable dispersion liquid is obstructed. Thus, only a carbon nanotube aggregate wherein a carbon nanotube aggregate with the large sized clumps is removed by passing the carbon nanotube aggregate through a net, filter or mesh etc is suitable for obtaining a stable carbon nanotube liquid using the following process.

It is preferred to carry out a pre-dispersion process prior to the next dispersion process on the classified carbon nanotube aggregate (S105). The pre-dispersion process is a process of dispersing by stirring the carbon nanotubes aggregate in a solvent. Although a dispersion method using a jet mill is preferred on the carbon nanotubes used in the carbon nanotube composite material of the present invention, as described below, by performing a pre-dispersion process it is possible to prevent the carbon nanotubes from clogging in the jet mill and it is possible to increase the dispersibility of the carbon nanotubes. It is preferred to use a stirrer in the pre-dispersion process.

A dispersion process of dispersing the carbon nanotube aggregate having undergone the pre-dispersion step in a dispersion liquid is performed (S107). A method for dispersing carbon nanotubes using shear stress is preferred in the dispersion process of the carbon nanotube aggregate to a dispersion liquid and a jet mill is preferred. It is possible to favorably use a wet type jet mill. A wet type jet mill pressures feed mixed products in a solvent from a nozzle arranged in a sealed state within a pressure resistant container as a high speed flow. The carbon nanotubes are dispersed by collision of opposing flows within the pressure resistant container, collision against container walls, turbulence produced by high speed flows and by a shear flow. In the case where a nano-jet mill (JN10, JN100, JN1000) manufactured by JOKOH ltd. is used as the wet type jet mill, a processing pressure in the dispersion process is preferred to be a value within a range of 10 MPa or more and 150 MPa or less.

The carbon nanotube dispersion liquid dispersed in this way maintains excellent electrical properties, thermal conduction and mechanical properties of the carbon nanotubes, has a high level of dispersion properties and a stable dispersion liquid can be provided.

Next, a matrix solution obtained by dissolving a matrix in a solvent is prepared, added to the carbon nanotube dispersion liquid, and sufficiently stirred to disperse the carbon nanotubes in the matrix (S109). As described above, in the carbon nanotube composite material of the present invention, the carbon nanotube dispersion liquid and matrix solution are mixed so that it becomes 0.01% by mass or more and 70% by mass or less and more preferably 0.1% by mass or more and 50 t % by mass or less when the mass of the carbon nanotube composite as a whole is 100% by mass.

The carbon nanotube composite material is solidified by pouring the sufficiently mixed solution into a petri dish or the like and drying at room temperature (S111).

The solidified carbon nanotube composite material is arranged within a vacuum drying oven and dried and the solvent is removed (S113). Here, the drying temperature is a temperature at which the solvent can be sufficiently removed from the carbon nanotube composite material and at which the matrix does not deteriorate. Therefore, although it is possible to be changed by the matrix used in the carbon nanotube composite material, for example, if the temperature is around 80° C., the solvent is sufficiently removed and the matrix does not deteriorate.

[Solvent]

It is possible to select any solvent as the solvent used in the dispersion liquid of the carbon nanotubes and matrix solvent used in the carbon nanotube composite material of the present invention according to the used matrix as long as it is an organic solvent which can dissolve a matrix. For example, it is possible to use toluene, xylene, acetone, and carbon tetrachloride. In particular, many rubbers including fluorocarbon rubber and silicon rubber can be dissolved and methyl isobutyl ketone (called MIBK below) which is a good solvent for carbon nanotubes is preferred as the solvent used in the carbon nanotube composite material of the present invention.

A dispersant may be added to the carbon nanotube dispersion liquid. The dispersant serves to improve dispersibility or the dispersion stabilizing ability of the carbon nanotubes.

In this way, it is possible to manufacture the carbon nanotube composite material of the present invention which has highly conductivity and can exhibit excellent durability against repeated stress such as strain. The manufactured carbon nanotube composite material of the present invention can be used as a conductive material, and in the case of use in, for example, electronics such as actuators, sensors and transducers and can be used in a solar cell, an organic EL or the like, a process suitable for each application can be performed. Since it can be appropriately selected from known techniques, a detailed description thereof will be omitted.

Example 1

[Production of Carbon Nanotube Aggregate]

A carbon nanotube aggregate was manufactured using the manufacturing apparatus 500 of FIG. 2 described above. In the present example, a quartz tube with cylindrical shape or the like was used as a vertical synthesis furnace 510. A substrate holder 505 made of quartz was arranged downflow 20 mm from the horizontal position of the center. A heating means 530 comprised from a heat resistance coil arranged on the exterior periphery of the synthesis furnace 510 and a heat temperature adjustment means was arranged, and a heated region 531 within the synthesis furnace 510 heated to a certain temperature was set.

A gas flow formation means 521 comprised from a heat resistant inconel alloy 600 which forms a 78 mm diameter cylinder shaped flat hollow structure was arranged to connect and link with an end of the first gas supply pipe 541 within the synthesis furnace 510. The first gas supply pipe 541 was linked and connected to the center of the gas flow formation means 521. The gas flow formation means 521 was placed inplane roughly parallel to the surface of the catalyst layer of the substrate 501 and the center of the substrate 501 was arranged to match the center of the gas flow formation means 521. In the present example, the gas flow formation means 521 has a cylinder shape with a hollow structure and dimensions of upper end diameter of 22 mm×lower end diameter of 78 mm and four pipes having a diameter of 32 mm were connected. In addition, a second gas supply pipe 543 arranged so to match the center of the first gas supply pipe 541 extends so as to match the center of the gas flow formation means 521 and an exit with a diameter of 13 mm was arranged.

The distance between a connection part of the pipe 555 and pipe 557 of the gas flow formation means 521 and the surface of an opposing catalyst layer was set to 150 mm.

Here, a distance of 150 mm was intentionally arranged between the gas flow formation means 521 and the catalyst surface, the heated volume of the first gas flow path 545 and second gas flow path 547 was increased and this heated volume was arranged. The first gas flow path 545 is connected to the gas flow formation means 521 and the first gas flow path 545 arranged with a turbulence prevention means is arranged with four φ32 mm pipes 555 arranged with a honeycomb structure comprised from a heat resistant alloy inconel alloy 600 and the second gas flow path 547 comprises a φ13 mm pipe 557 arranged to match the center of the four pipes 555.

A carbon weight flux adjustment means 571 is formed by each connecting a source gas cylinder 561 for a carbon compound which becomes the source material of a carbon nanotube, an atmosphere gas cylinder 563 as a carrier gas for a source gas or catalyst activator material, and a reduction gas cylinder 565 for reducing a catalyst to a gas flow device, and the amount of source gas is controlled by supplying the source gas to the first gas supply pipe 541 while independently controlling the amount of gas supplied by each cylinder. In addition, a second carbon weight flux adjusting means 573 is formed by connecting a catalyst activator material cylinder 567 to a gas flow device and the supply amount of the catalyst activator material is controlled by supplying to the second gas supply pipe 543.

A Si substrate (height 40 mm×width 40 mm) with a 500 nm thermal oxide film sputtered with 30 nm of $Al_2O_3$ and 1.8 nm of Fe which is the catalyst was used as the substrate 501.

The substrate 501 was transferred onto the substrate holder 508 arranged 20 mm downflow from a horizontal position in the center of the heating region 531 within the synthesis furnace 502. The substrate was arranged in a horizontal direction. In this way, the catalyst on the substrate and the flow path of the mixed gas intersects in a perpendicular direction and the source gas is efficiently supplied to the catalyst.

Next, the interior of the synthesis furnace 510 set to a furnace pressure of $1.02\times10^5$ Pa was increased in temperature from room temperature to 830° C. over 15 minutes using the heating means 530 while introducing a mixed gas (total flow amount: 2000 sccm) comprising 200 sccm of He and 1800 sccm of $H_2$ as a reduction gas from the first gas supply pipe 541. The substrate attached with the analyst was further heated for 3 minutes while maintaining a temperature of 830° C. while supplying 80 sccm of water as the catalyst activator material from the second gas supply pipe 543. In this way, the iron catalyst layer was reduced, conversion to micro particles suitable for growth of a single-walled carbon nanotube was encouraged and multiple nanometer sized catalyst particles with different sizes were formed on an alumina layer.

Next, the temperature of the synthesis furnace 510 with a furnace pressure of $1.02\times10^5$ Pa (air pressure) was set at 830° C. and an atmosphere gas He:total flow amount ratio 89% (1850 sccm) and $C_2H_4$ which is the source gas, total flow amount ratio 7% (150 sccm) was supplied from the first gas flow path 545, and He (absolute moisture 23%) containing $H_2O$ as the catalyst activator material:total flow amount ratio 4% (80 sccm) was supplied from the second gas supply pipe 543 for 10 minutes.

In this way, a single-walled carbon nanotube was grown from each catalyst micro particle and an orientated single-walled carbon nanotube aggregate was obtained. In this way, carbon nanotubes were grown on the substrate 501 under an environment containing the catalyst activator material.

After the growth process, only the atmosphere gas (total flow amount 4000 sccm) was supplied for 3 minutes from the first gas flow path 545 and the remaining source gas and generated carbon impurities and catalyst activator agent were removed.

Following this, after cooling the substrate to 400° C. or less, the substrate is removed from the interior of the synthesis furnace 510 and the manufacturing process of a series of single-walled carbon nanotube aggregates is complete

[Properties of Carbon Nanotubes Manufactured in Example 1]

Characteristics of the carbon nanotube aggregate depend on the details of the manufacturing conditions, however, the manufacturing conditions of Example 1 are as a typical value, length of 100 μm and average diameter of 3.0 nm.

[Raman Spectrum Evaluation of Carbon Nanotube Aggregate]

A Raman spectrum of the carbon nanotube aggregate obtained in Example 1 was measured. It can be seen that a sharp G-band peak was observed in the vicinity of 1590 $cm^{-1}$, and a graphite crystal structure was present in the carbon nanotubes forming the carbon nanotube aggregate of the present invention.

In addition, a D-band peak was observed in the vicinity of 1340 $cm^{-1}$, derived from a defect structure etc, and shows that significant defects are included in the carbon nanotubes. Because the RBM mode due to a plurality of single-walled carbon nanotubes was observed at a low wavelength (100~300 $cm^{-1}$), it was found that the graphite layer is a single-walled carbon nanotube. The G/D ratio was 8.6.

[Purity of Carbon Nanotube Aggregate]

The carbon purity of the carbon nanotube aggregate was calculated from element analysis results using fluorescent X-rays. As a result of an element analysis by fluorescence X-rays of the carbon nanotube aggregate peeled from the substrate, the weight percent of carbon was 99.98%, the weight percent of iron was 0.013%, and other elements were not measured. From this result, the carbon purity was measured as 99.98%.

[Dispersion of Carbon Nanotubes]

The obtained carbon nanotube aggregate was peeled from the substrate 501 by sucking the orientated carbon nanotube aggregate using a vacuum pump, and the carbon nanotube aggregates attached to a filter were recovered. At this time, the orientated carbon nanotube aggregate was dispersed to obtain a bulk shaped carbon nanotube aggregate.

Next, the carbon nanotube aggregate is placed on one net with 0.8 mm apertures and sucked via the net using a vacuum cleaner, the product which passes through is gathered, and classified except for the clump shaped carbon nanotube aggregate with a large size (classification process).

The carbon nanotube aggregate was measured using a Carl Fisher reaction method (Coulometric titration method trace moisture measurement device CA-200 manufactured by Mitsubishi Chemical Analytech). After drying the carbon nanotube aggregate under certain conditions (under a vacuum for 1 hour at 200° C.), the vacuum is released and about 30 mg of the carbon nanotube aggregates are extracted in the glove box of a dry nitrogen gas current and transferred to a glass boat of a moisture meter. The glass boat is moved to a vaporizer, heated for 2 minutes at 150° C. and the aerated water component during this time is transferred by the nitrogen gas and reacts with iodine due to the Carl Fisher reaction. At this time, the quantity of water component is detected by the quantity of electricity required for generating the same quantity of iodine that was consumed. The carbon nanotube aggregate before drying has a water component of 0.8% by weight according to the method. The carbon nanotube aggregate after drying has a reduced water component of 0.3% by weight.

100 mg of the classified carbon nanotube aggregate was precisely weighed, introduced to a 100 ml flask (three holes: vacuum type, temperature adjustment type), held for 24 hours when the temperature reached 200° C. under a vacuum and dried. After drying was completed, the flask was heated and while in a vacuum process state, 20 ml of a dispersion medium MIBK (methyl isobutyl ketone) (manufactured by Sigma-Aldrich Japan) was introduced to the flask and the carbon nanotube aggregate was prevented from contact with air (drying process).

Furthermore, of MIBK (manufactured by Sigma-Aldrich Japan) was added to 300 ml. A stirrer was put in the beaker, the beaker was sealed with aluminum foil and the carbon nanotube aggregate with MIBK was stirred for 24 hours using a stirrer at 600 RPM ensuring that the MIBK did not vaporize.

In the dispersion process, the carbon nanotube aggregate with MIBK was passed through a 200 μm flow path using a wet type jet mill (Nano Jet Pal (Registered Trademark) JN10 manufactured by JOKOH) under a pressure of 60 MPa, the aggregate was dispersed in MIBK and a carbon nanotube dispersion liquid was obtained with a weight concentration of 0.033 wt %.

The dispersion liquid was again stirred using the stirrer at a normal temperature for 24 hours. At this time, the solvent was raised in temperature to 70° C. and the MIBK was vaporized using a solvent leaving around 150 ml. The weight concentration of carbon nanotubes at this time was around 0.075 wt % (dispersion process). The carbon nanotube dispersion liquid related to the present invention was obtained in this way.

In this example, fluorocarbon rubber (Daiel-G912 manufactured by Daikin Industries) was used as a matrix. 150 ml of the carbon nanotube dispersion liquid was added to 50 ml of the fluorocarbon rubber solution so that the contained amount of carbon nanotubes became 10% in the case where the mass of the entire carbon nanotube composite material is set at 100% by mass, stirred for 16 hours at room temperature under a condition of about 300 rpm using a stirrer and condensed until the total amount became about 50 ml.

By pouring the sufficiently mixed solution into a petri dish and drying at room temperature for 12 hours, the carbon nanotube composite material solidified.

The solidified carbon nanotube composite material was inserted into a vacuum drying furnace at 80° C., dried for 24 hours and the solution was removed. In this way, the carbon nanotube composite material 200 of Example 1 was obtained.

Example 2

As Example 2, a carbon nanotube composite material 210 prepared in the same manner as in Example 1 so that it contained carbon nanotubes of 1% was obtained.

Example 3

As Example 3, a carbon nanotube composite material 230 prepared in the same manner as in Example 1 using isoprene (IR) (ZEON Corporation) as a matrix so that it contained carbon nanotubes of 10% was obtained.

Example 4

As Example 4, a carbon nanotube composite material 250 prepared in the same manner as in Example 1 using nitrile rubber (NBR) (ZEON Corporation) as a matrix so that it contained carbon nanotubes of 10% was obtained.

Example 5

As Example 5, a carbon nanotube composite material 270 prepared in the same manner as in Example 1 using SEBS (Asahi Kasei Co., Ltd.) as the matrix so that it contained carbon nanotubes of 10% was obtained.

Comparative Example 1

As Comparative Example 1, a carbon nanotube composite material 900 prepared in the same manner as in Example 1 using single-walled carbon nanotubes (Unidym Corp) synthesized using HiPco (High-pressure carbon monoxide process) method so that it contained carbon nanotubes of 10% was obtained.
[Properties of Carbon Nanotubes by HiPco Method]

The characteristic of the carbon nanotube aggregate synthesized by the HiPco method (hereinafter, referred to as HiPco) as a typical value had a length of 1 μm or less and an average diameter of 0.8 to 1.2 nm.
[Raman spectral evaluation of HiPco]

It could be seen that a HiPco Raman spectrum shows that a sharp G-band peak was observed in the vicinity of 1590 $cm^{-1}$ and a graphite crystal structure was present in the carbon nanotubes. In addition, a D-band peak was observed in the vicinity of 1340 $cm^{-1}$, derived from a defect structure etc, and shows that significant defects are included in the carbon nanotubes. Because the RBM mode due to a plurality of single-walled carbon nanotubes was observed at a low wavelength (100 to 300 $cm^{-1}$), it was found that the graphite layer is a single-walled carbon nanotube. The G/D ratio was 12.1.
[Purity of Carbon Nanotube Aggregate]

Carbon purity of HiPco calculated from element analysis results using fluorescent X-rays was low compared to carbon nanotubes used in the examples and the weight percent of carbon was 70%.

Comparative Example 2

As Comparative Example 2, a carbon nanotube composite material 910 prepared in the same manner as in Example 1 using NANOCYL (nanocyl Inc.) which is a multi-walled carbon nanotube so that it contained carbon nanotubes of 10% was obtained.
[Properties of NANOCYL]

The characteristics of NANOCYL, as a typical value, had a length of 1.5 μm and an average diameter of 9.5 nm.
[Raman Spectrum Evaluation of NANOCYL]

It could be seen that a NANOCYL Raman spectrum shows that a G-band peak was observed in the vicinity of 1590 $cm^{-1}$ and a graphite crystal structure was present in the carbon nanotubes. In addition, a D-band peak was observed in the vicinity of 1340 $cm^{-1}$ derived from a defect structure etc, and shows that significant defects are included in the carbon nanotubes. Because NANOCYL is a multi-walled carbon nanotube, the RBM mode due to a plurality of single-walled carbon nanotubes was not observed at a low wavelength (100 to 300 $cm^{-1}$). The graphite degree was low compared to the carbon nanotubes used in the Examples and the NANOCYL G/D ratio was 0.53.
[Purity of Carbon Nanotube Aggregate]

The Carbon purity of NANOCYL calculated from element analysis results using fluorescent X-rays was low compared to carbon nanotubes used in the examples and the weight percent of carbon was 90%.

Comparative Example 3

As Comparative Example 3, a carbon nanotube composite material prepared in the same manner as in Example 4 using single-walled carbon nanotubes (Unidym Corp) synthesized using HiPco (High-pressure carbon monoxide process) method so that it contained carbon nanotubes of 10% as a matrix was obtained.
[Raman Spectrum]

Figure 4:
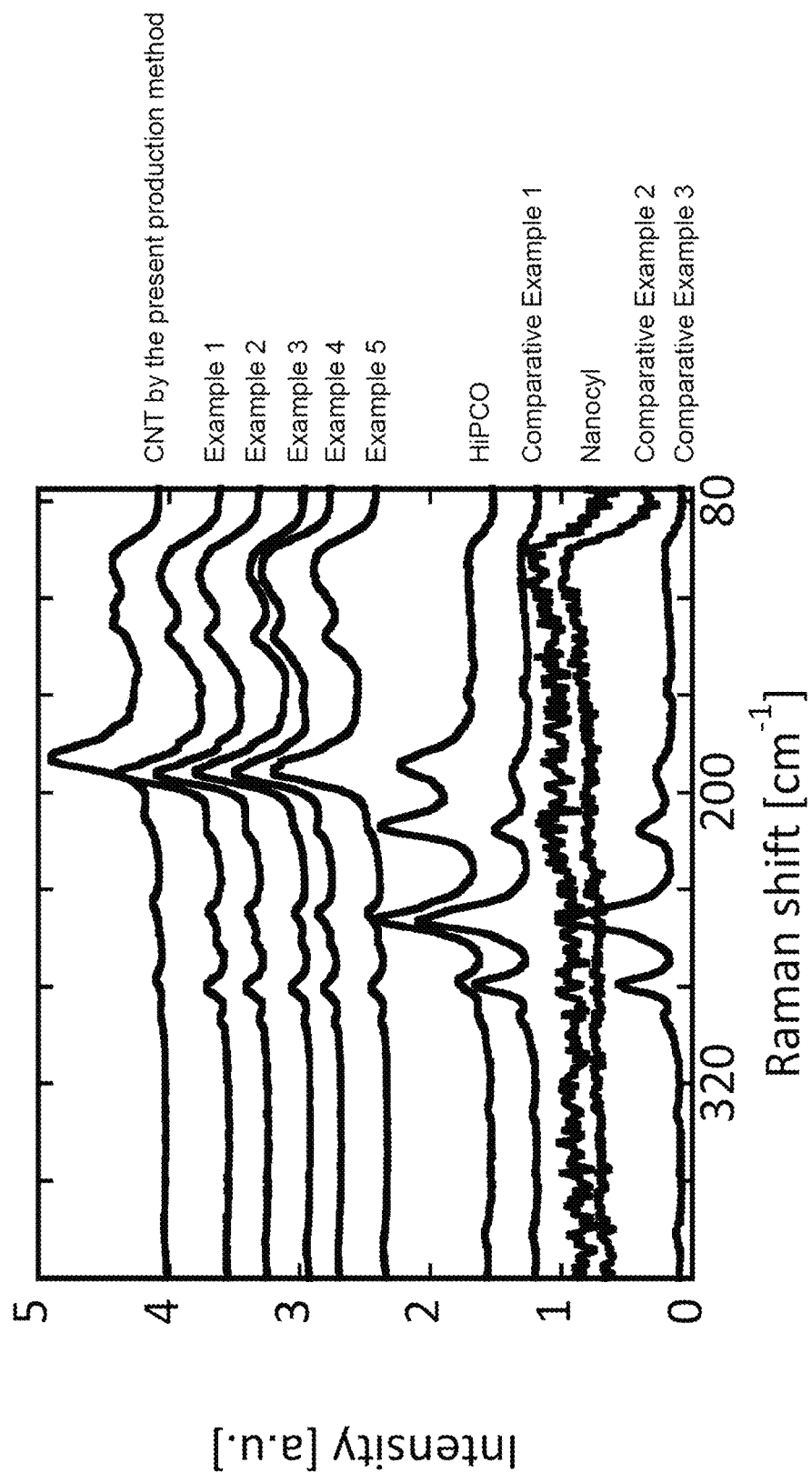
FIG. 4 is a diagram showing a Raman spectrum in RBM of the carbon nanotube composite material according to one embodiment of the present invention.

A Raman spectroscopic analysis at a wavelength of 633 nm was performed on the carbon nanotube composite material of the Examples and Comparative Examples described above. FIG. 4 shows the Raman spectrum in the RBM of a single body of carbon nanotubes (SGT) used in the carbon nanotube composite material of the Examples, a single body of HiPco used in the carbon nanotube composite material of Comparative Example 1, and a single body of NANOCYL used in the carbon nanotube composite material of Comparative Example 2, and each carbon nanotube composite material from Comparative Examples 1 to 3 respectively. In the Raman spectrum of the RBM, a Raman peak corresponding to the type of carbon nanotube used is detected and its characteristics are well conserved in the carbon nanotube composite material including a matrix.

In a Raman spectroscopic analysis with a wavelength of 633 nm, the carbon nanotube composite material of the present example had a peaks at $110\pm10$ cm$^{-1}$, $190\pm10$ cm$^{-1}$, and $135\pm10$ cm$^{-1}$, $250\pm10$ cm$^{-1}$, $280\pm10$ cm$^{-1}$ over a wide wavelength range. However, the carbon nanotube composite material of the Comparative Examples did not have at least one peak in a region of $110\pm10$ cm$^{-1}$, $190\pm10$ cm$^{-1}$, and 200 cm$^{-1}$ or more.

[G/D ratio]

Figure 5:
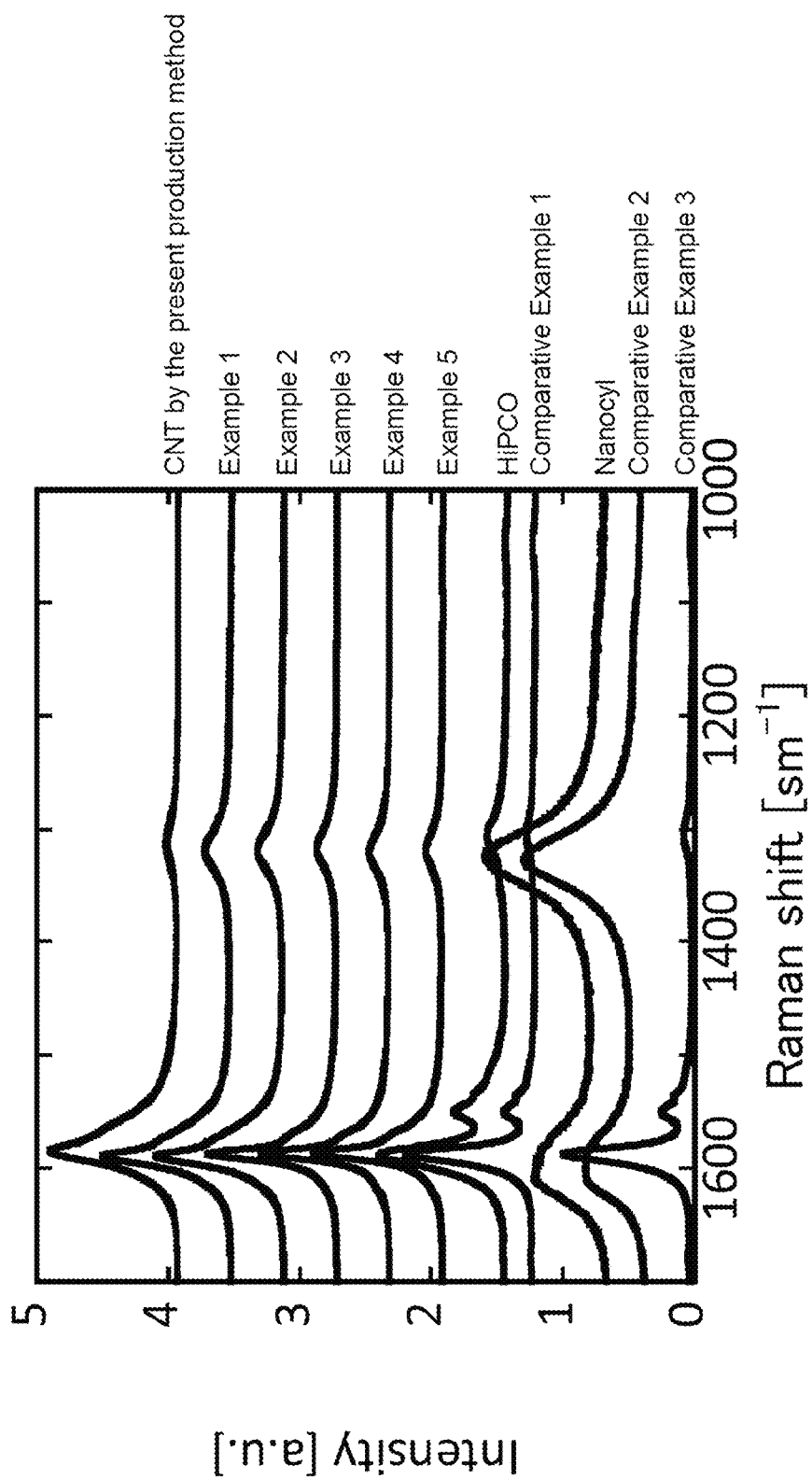
FIG. 5 is a diagram showing a Raman spectrum at a wavelength of 633 nm of the carbon nanotube composite material according to one example of the present invention.

Examples 1 to 4 and for Comparative Examples 1 to 3 were evaluated for G-band and D-band as described above. FIG. 5 shows carbon nanotubes (SGT) used in the carbon nanotube composite material of the Examples, HiPco used in the carbon nanotube composite material of Comparative Example 1, and a single body of NANOCYL used in the carbon nanotube composite material of Comparative Example 2, and the Raman spectrum at a wavelength of 633 nm of each carbon nanotube composite material from Comparative Examples 1 to 3. A Raman peak according to the type of carbon nanotubes used was detected as a maximum peak intensity G in the range of 1560 cm$^{-1}$ or more and 1600 cm$^{-1}$ or less and the maximum and peak intensity D of the in the range of 1310 cm$^{-1}$ or more and 1350 cm$^{-1}$ or less, and its characteristics are well conserved including the G/D ratio even in the carbon nanotube composite material comprising a matrix.

The G/D ratio for Examples 1 to 4 and Comparative Examples 1 to 3 is summarized in FIG. 9. The carbon nanotube composite material in the Examples has a G/D ratio or 3 or more. A Raman spectrum measured at a wavelength of 633 nm shows an excellent index with respect to RBM and G/D ratio which can evaluate carbon nanotubes in a carbon nanotube composite material without depending on the matrix in the carbon nanotube composite material. In the measurement at a wavelength of 532 nm, the Raman spectrum was dependent on the type of matrix used in the carbon nanotube composite material.

[Relationship Between Repeated Stress Load and Electrical Characteristics]

Figure 6:
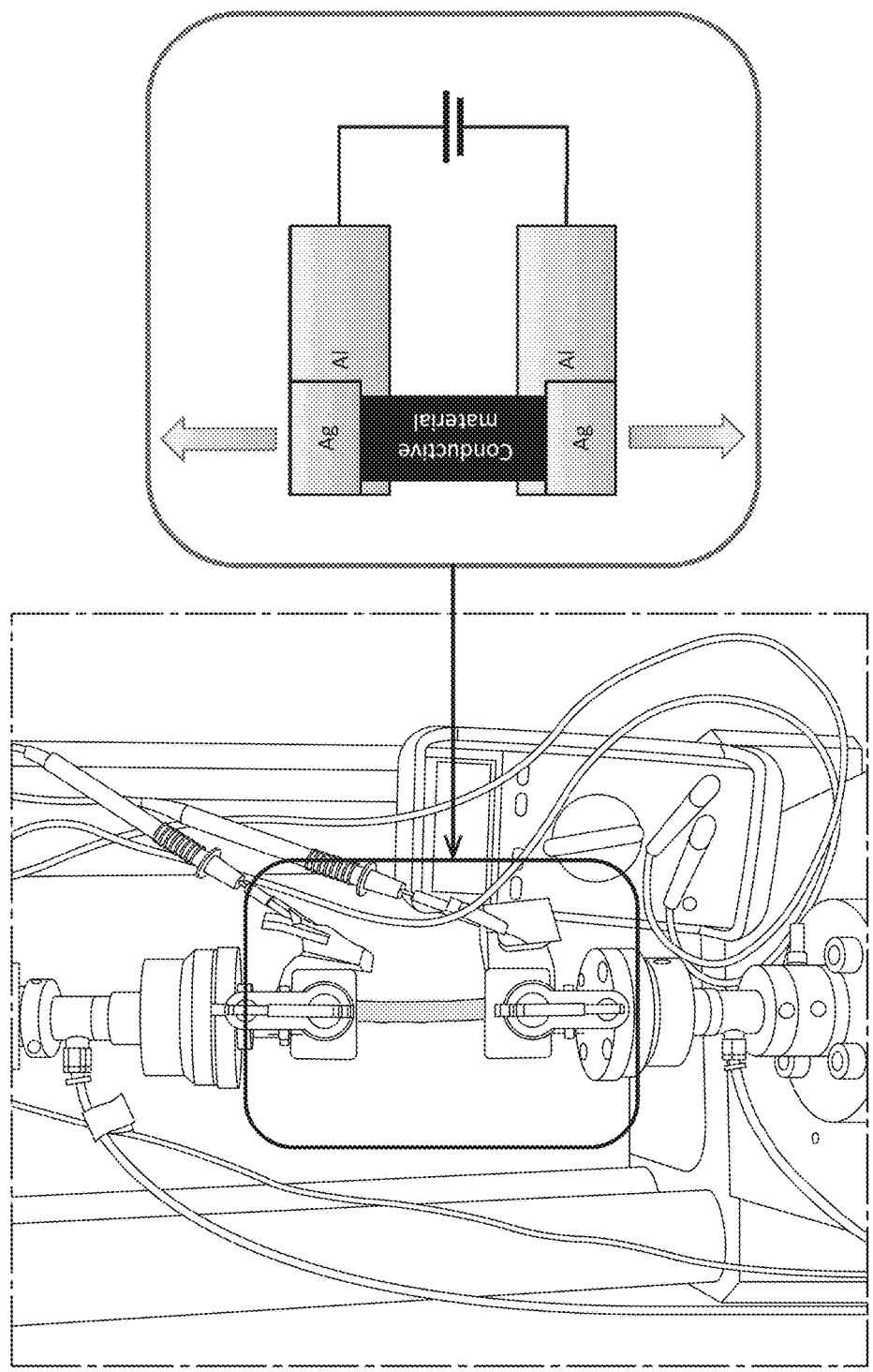
FIG. 6 is a device used for repeated stress load test of a carbon nanotube composite material and a schematic view thereof according to one example of the present invention.

Next, the electrical characteristics of carbon nanotube composite materials were evaluated in the case where a repeated stress load was applied. FIG. 6 is a device used in the repeated stress loading of the present embodiment and a schematic view thereof. The shape of the sample complies with standard JIS K6251-7, and a repeated stress load test was performed by connecting both ends of the carbon nanotube composite material to a resistance measuring device by clipping between a metal piece of silver (Ag) and a metal piece of aluminum (Al), and repeating a stress load 100 times at 10% elongation of the carbon nanotube composite material from both ends.

Figure 7A:
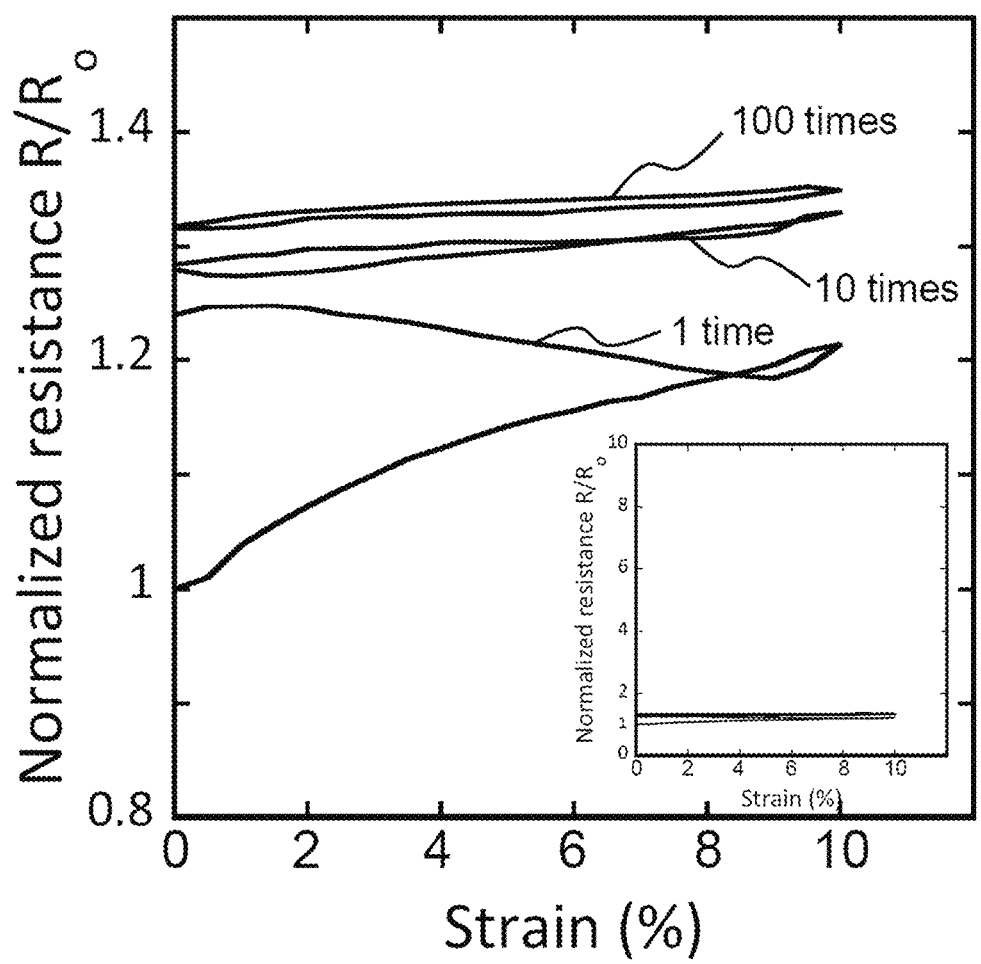
FIG. 7A is a diagram showing an electric resistance ratio R/R$_0$ in the repeated stress load test of a carbon nanotube composite material according to one example of the present invention, and shows the results using a carbon nanotube composite material in Example 1.
Figure 7B:
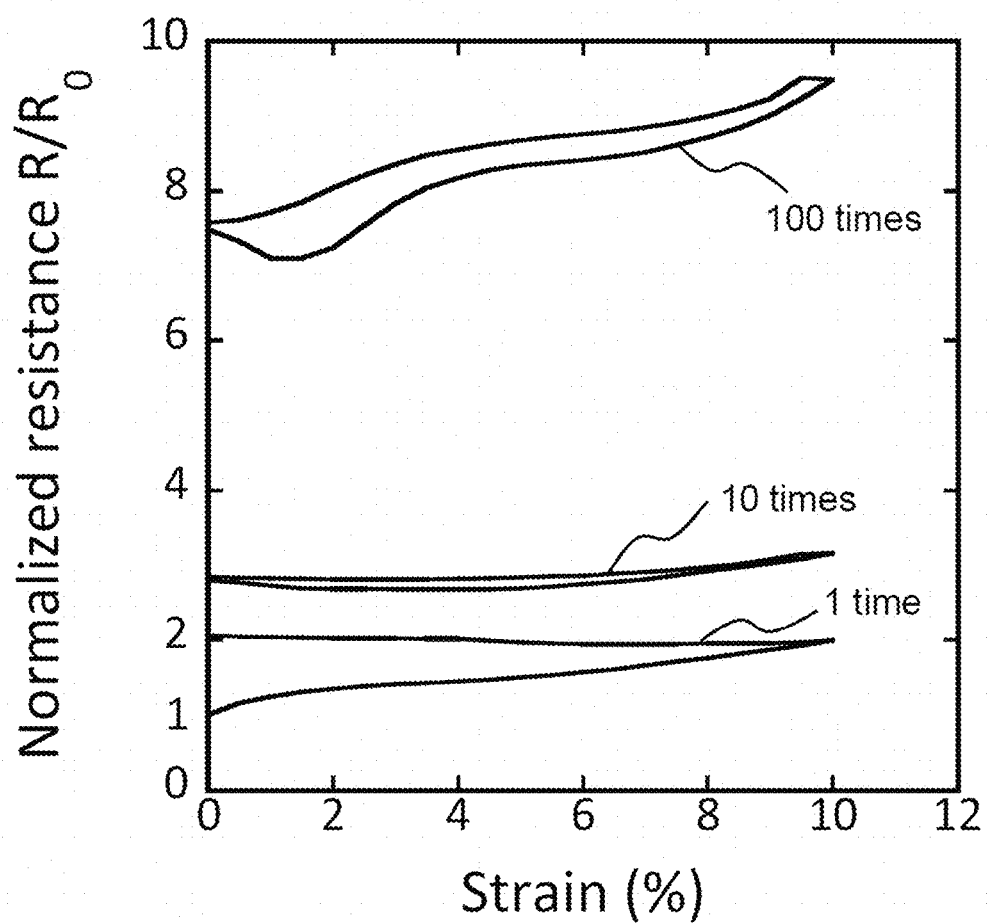
FIG. 7B is a diagram showing an electric resistance ratio R/R$_0$ in the repeated stress load test of a carbon nanotube composite material according to one example of the present invention, and shows the results using a carbon nanotube composite material of Comparative Example 1.

FIG. 7 shows the ratio R/R$_0$ of the electrical resistance R of the load of the repeated stress applied 100 times at 10% elongation with respect to electrical resistance R$_0$ before applying the load and FIG. 7(*a*) shows the results of using the carbon nanotube composite material of Example 1 and FIG. 7(*b*) shows the results of using the carbon nanotube composite material of Comparative Example 1. Measurement of electrical resistance in FIG. 7 shows the first, 10$^{th}$ and 100$^{th}$ results. As can be seen from FIG. 7(*a*), the carbon nanotube composite material of Example 1 demonstrates excellent durability against repeated stress up to 100$^{th}$ stress load with almost no change in the electrical resistance ratio R/R$_0$. On the other hand, as is clear from FIG. 7(*b*), the carbon nanotube composite material of Comparative Example 1 had a larger electric resistance ratio R/R$_0$ with respect to repeated stress. That is, the conductivity structure due to the carbon nanotubes in the carbon nanotube composite material of Comparative Example 1 is broken due to repeated stress load and as result it is presumed that electrical resistance increases in the carbon nanotube composite material.

The electrical resistance ratio R/R$_0$ after loading of the repeated stress applied 100 times of the carbon nanotube composite material in Examples 1 to 4 and Comparative Examples 1 to 3 is shown in FIG. 9. In the Examples, the electrical ratio R/R$_0$ after loading of the repeated stress applied 100 times is a value of 3 or less and exhibits excellent durability. On the other hand, in the Comparative example, the electrical ratio R/R$_0$ after loading of the repeated stress applied 100 times exceeds 3 and shows no resistance to repeated stress load.

[Relationship Between Strain and Conductivity]

Although the carbon nanotube composite material is loaded with 10% strain 10% in a repeated stress load as test described above, next the electrical characteristics when the carbon nanotube composite material is loaded with 10% strain was evaluated by measuring electrical conductivity of the carbon nanotube composites. FIG. 9 shows the conductivity of the carbon nanotube composite material of Examples and Comparative Examples after loading 10% strain. The carbon nanotube composite material of the Examples has conductivity of 0.01 S/cm or more at a 10% elongation.

[Permanent Strain]

Figure 8A:
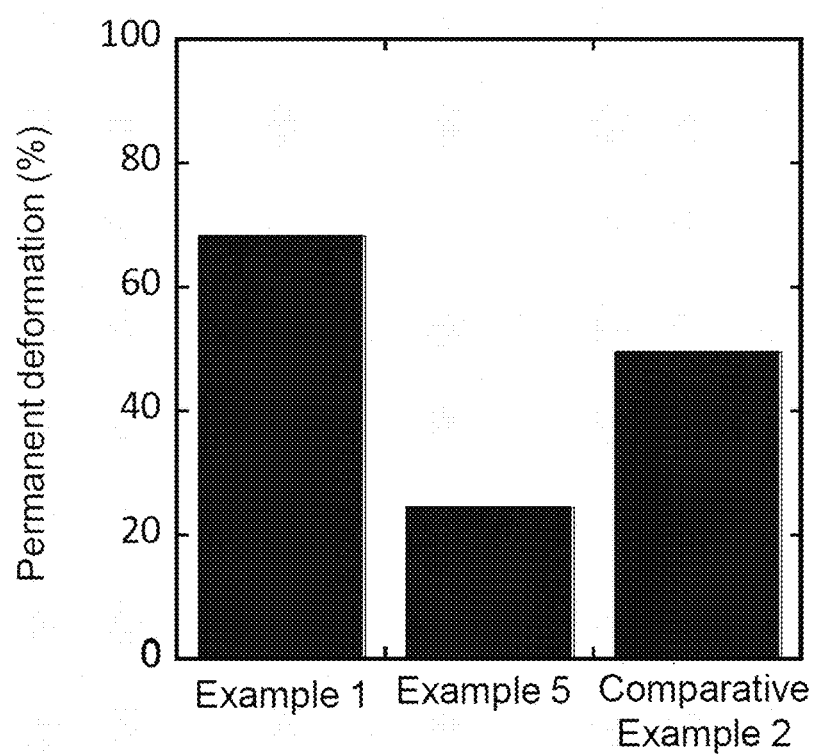
FIG. 8A is a diagram showing measurement results of permanent deformation of the carbon nanotube composite material according to one example of the present invention and is a diagram showing permanent stress.
Figure 8B:
FIG. 8B is a diagram showing the measurement sample after adding pressure.

Measuring permanent strain with respect to the carbon nanotube composite material of the Examples and Comparative Examples is shown in FIG. 9. Measurement of permanent strain was performed in accordance with standard JIS K 6262 at 40° C. A measurement sample was obtained by processing $13.0\pm0.5$ mm diameter and thickness of $6.3\pm0.3$ mm sample of each carbon nanotube composite material. A pressure of 25% was added to the measurement sample and was held for 24 hours. FIG. 15 shows the measurement results of permanent stress. FIG. 8(*a*) is a diagram showing permanent stress and FIG. 8(*b*) is a diagram showing the measurement sample after adding pressure.

From the results of the Examples and Comparative Examples, the carbon nanotube composite material according to the present invention can be seen to have excellent durability against permanent stress. In addition, it can be seen that when comparing the results of Examples 1 to 5, durability against permanent stress is dependent on the matrix.

[Modulus]

Measurement of an elastic modulus with respect to the carbon nanotube composite material of the Examples and Comparative Examples is shown in FIG. 9. The measurement of the elastic modulus was carried out according to standard JIS K 6254. The elastic modulus of the carbon nanotube composite material of Example 1 and Comparative Example 1 is shown in FIG. 9.

[Conductivity]

Conductivity was evaluated by exposing the carbon nanotube composite material in Examples 1 to 4 to a solvent, removing the matrix, extracting only the carbon nanotubes and performing a four-terminal method using Buckypaper with a 100 μm thickness. Conductivity became 60 S/cm in Example 1, 52 S/cm in Example 2, 59 S/cm in Example 3, and 66 S/cm in Example 4.

From the above examples, since the carbon nanotube composite material related to the present invention has high conductivity and excellent durability against repeated stress such as strain, it is clear that excellent characteristics as a conductive material are provided.

Because a conductive region in which the carbon nanotubes are present forms an efficient and continuous conductive path, the carbon nanotube composite material and conductive material according to the present invention has high conductivity in a small amount of carbon nanotubes. In addition, because each carbon nanotube and matrix has excellent deformability and mutually deforms following the shape of the other, the carbon nanotube composite material and conductive material according to the present invention can prevent structural changes, cracks and breakage of the conductive region where the nanotubes exist even after repeated stress such as strain. In this way, the carbon nanotube composite material and conductive material according to the present invention can exhibit excellent durability against repeated stress such as strain.

The invention claimed is:

1. A carbon nanotube composite material, comprising: carbon nanotubes dispersed in a matrix,
wherein
at least some of the carbon nanotubes dispersed in the matrix are single-walled carbon nanotubes having an average diameter of 1.0 nm to 30 nm observed at a wavelength of 100 to 300 $cm^{-1}$ of a radial breathing mode of Raman spectra,
the carbon nanotubes comprise 0.001% by mass to 70% by mass of the carbon nanotube composite material, where the entire carbon nanotube composite material is 100% by mass, and
the carbon nanotubes have an observed peak in each region of 110±10 $cm^{-1}$, 190±10 $cm^{-1}$ and 200 $cm^{-1}$ or more in a Raman spectroscopic analysis at a wavelength of 633 nm.

2. The carbon nanotube composite material according to claim 1 wherein the carbon nanotube composite material has conductivity of 0.01 S/cm or more at 10% elongation.

3. The carbon nanotube composite material according to claim 1 wherein the carbon nanotube composite material includes carbon nanotubes having conductivity of 1 S/cm or more and conductivity of the carbon nanotube composite material itself is 0.01 S/cm or more.

4. The carbon nanotube composite material according to claim 1 wherein permanent elongation of the carbon nanotube composite material is less than 60%.

5. The carbon nanotube composite material according to claim 1 wherein an elastic modulus of the carbon nanotube composite material is 0.1 MPa or more and 300 MPa or less.

6. The carbon nanotube composite material according to claim 1 wherein a length of the carbon nanotubes is 0.1 μm or more.

7. The carbon nanotube composite material according to claim 1 wherein carbon purity according to an analysis using fluorescence X-rays of the carbon nanotube is 90% by weight or more.

8. The carbon nanotube composite material according to claim 1 wherein a G/D ratio of the carbon nanotubes is 3 or more when a maximum peak intensity in the range of 1560 $cm^{-1}$ or more and 1600 $cm^{-1}$ or less is G and a maximum peak intensity in the range of 1310 $cm^{-1}$ or more and 1350 $cm^{-1}$ or less is D in a spectrum obtained in a measurement performed by a resonance Raman scattering measurement method.

9. The carbon nanotube composite material according to claim 1 wherein the matrix is an elastomer.

10. The carbon nanotube composite material according to claim 9 wherein the elastomer is one type or more selected from nitrile rubber, chloroprene rubber, chloro-sulfonated polyethylene, urethane rubber, acrylic rubber, epichlorohydrin rubber, fluorocarbon rubber, styrene—butadiene rubber, isoprene rubber, butadiene rubber, butyl rubber, silicone rubber, ethylene—propylene copolymer, and ethylene—propylene—diene terpolymer.

11. The carbon nanotube composite material according to claim 9 wherein the matrix includes a fluorocarbon rubber.

12. The carbon nanotube composite material according to claim 11 wherein the resin is at least one of silicone-based resins, modified silicone-based resins, acrylic-based resins, chloroprene-based resins, polysulfide-based resins, polyurethane-based resins, polyisobutyl-based resin and a fluoro-silicone-based resin.

13. A conductive material comprising the carbon nanotube composite material according to claim 1.

14. The carbon nanotube composite material according to claim 1, wherein the carbon nanotube composite material comprises a ratio $R/R_0$ of an electrical resistance R after a load of repeated stress of 100 times at 10% elongation with respect to an electrical resistance $R_0$ prior to applying a load of 3 or less.

15. A carbon nanotube composite material, comprising: carbon nanotubes dispersed in a resin,
wherein
at least some of the carbon nanotubes dispersed in the resin are single-walled carbon nanotubes having an average diameter of 1.0 nm to 30 nm observed at a wavelength of 100 to 300 $cm^{-1}$ of a radial breathing mode of Raman spectra,
the carbon nanotubes have an observed peak in each region of 110±10 $cm^{-1}$, 190±10 $cm^{-1}$ and 200 $cm^{-1}$ or more in a Raman spectroscopic analysis at a wavelength of 633 nm, and
the carbon nanotubes comprise 0.001% by mass to 70% by mass of the carbon nanotube composite material, where the entire carbon nanotube composite material is 100% by mass.

* * * * *